Aug. 15, 1939.　　　　G. F. KOTRBATY　　　　2,169,255
BUILDING UNIT AND ELEMENT
Original Filed April 22, 1935　　5 Sheets-Sheet 1
Fig. 1.
Fig. 2.
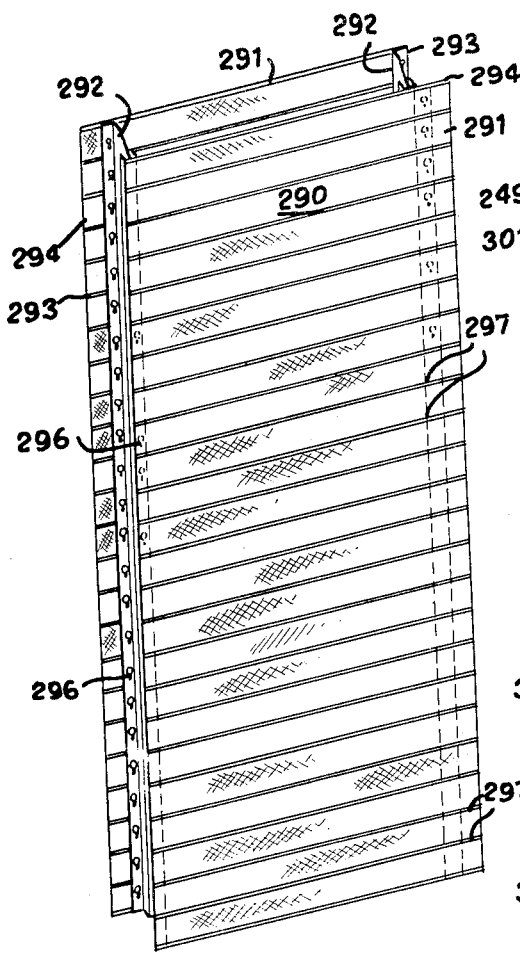
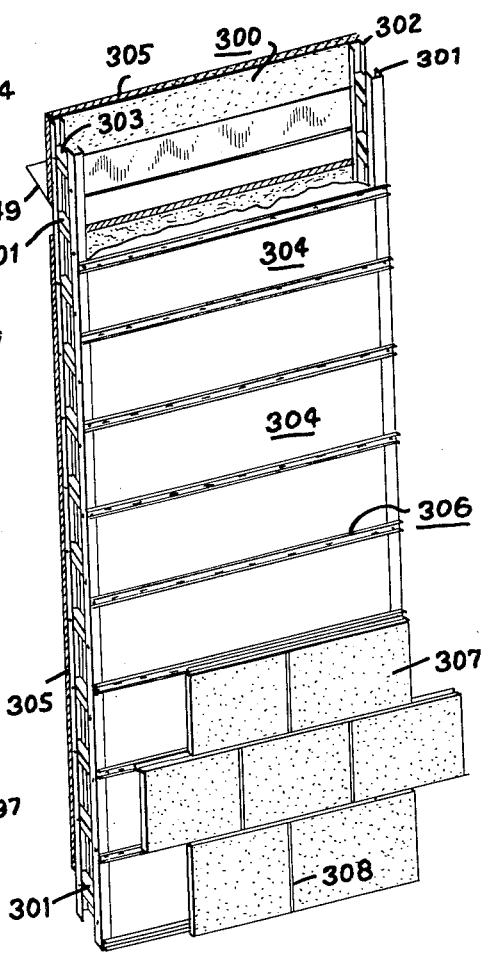
INVENTOR
*Guy F. Kotrbaty*
BY
*Frederick A. Norton*
ATTORNEY

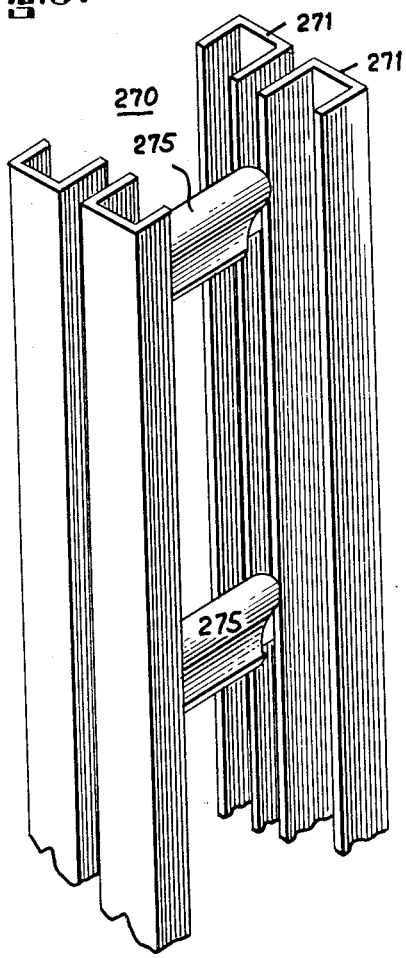
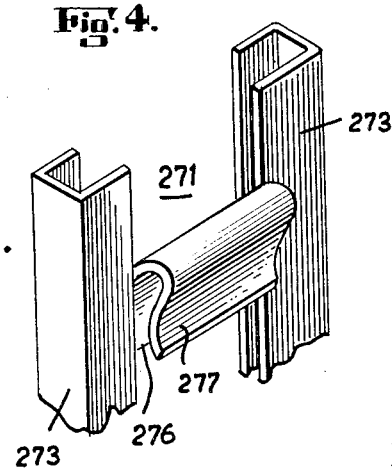
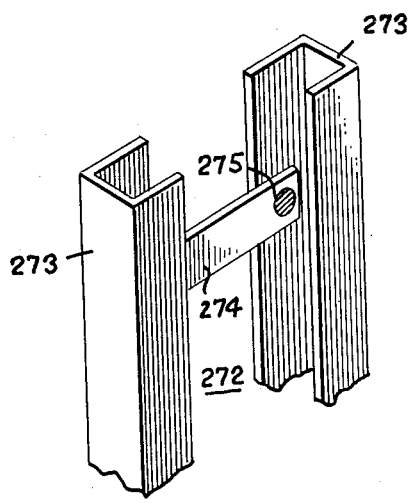

Aug. 15, 1939.   G. F. KOTRBATY   2,169,255
BUILDING UNIT AND ELEMENT
Original Filed April 22, 1935   5 Sheets-Sheet 3
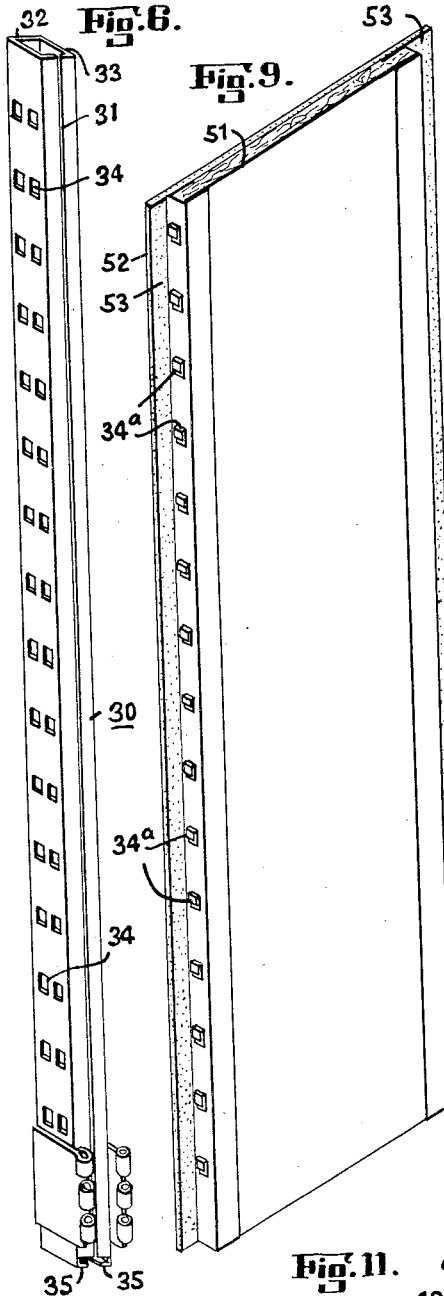
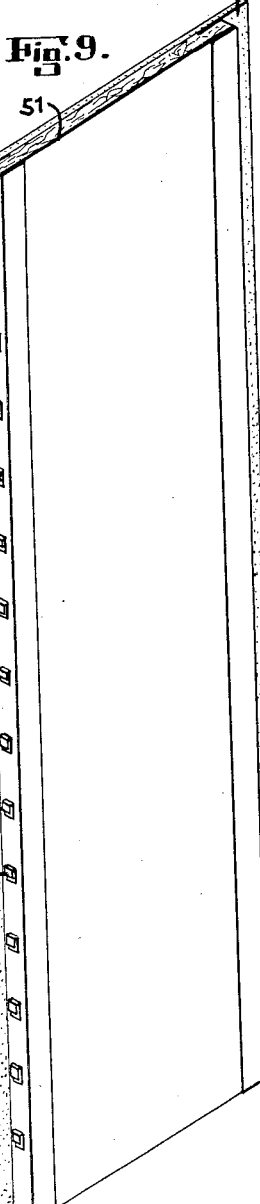
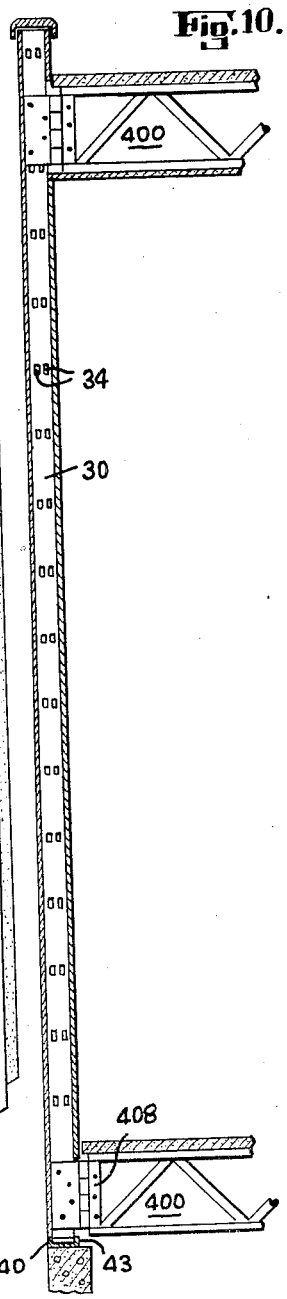
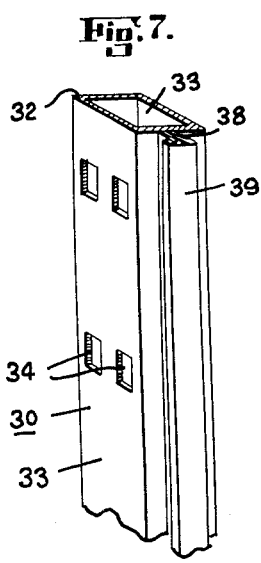
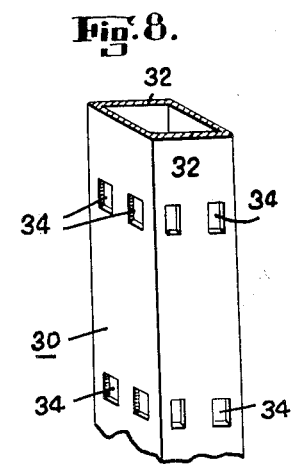
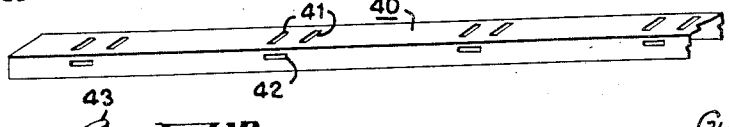
INVENTOR
*Guy F. Kotrbaty*
BY
*Frederick A. Norton*
ATTORNEY

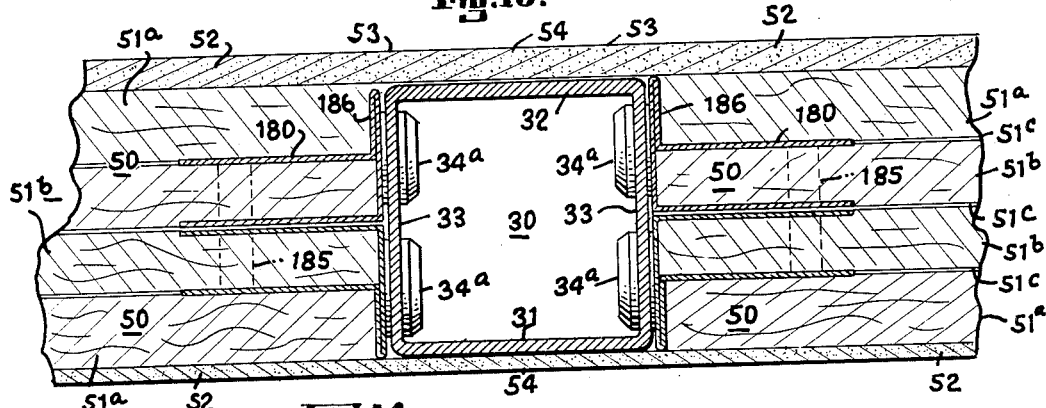
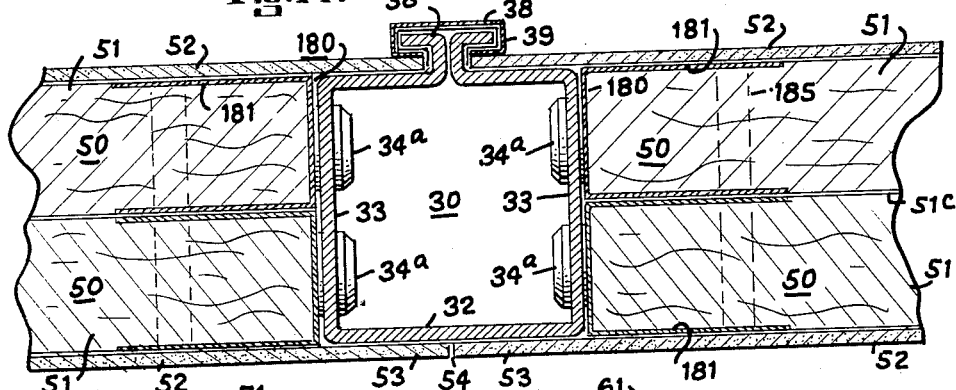
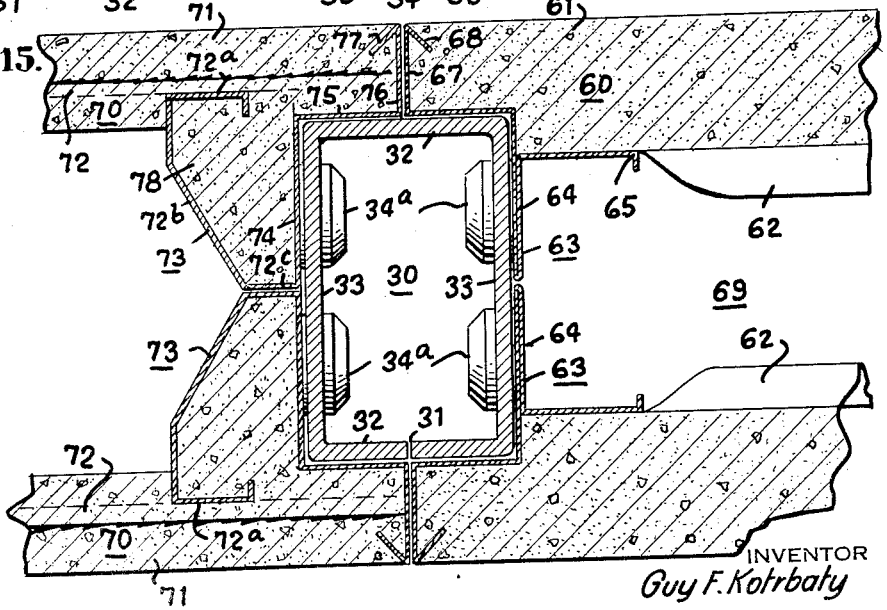

Aug. 15, 1939.   G. F. KOTRBATY   2,169,255
BUILDING UNIT AND ELEMENT
Original Filed April 22, 1935   5 Sheets-Sheet 5
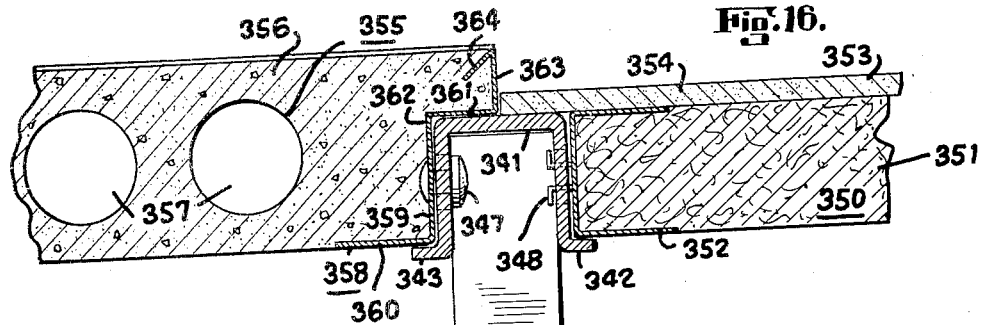
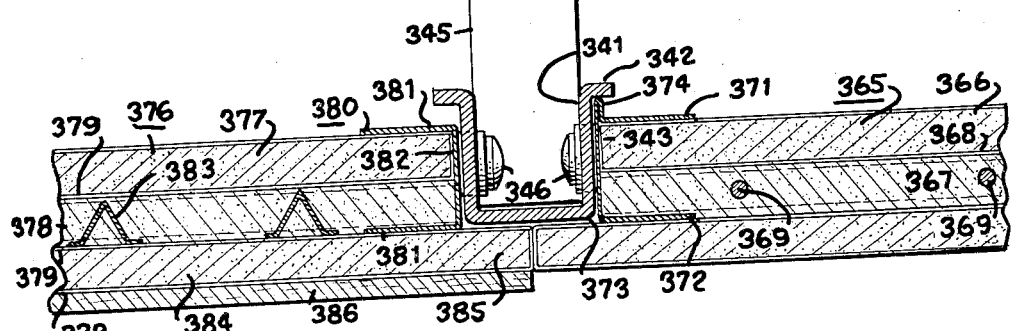
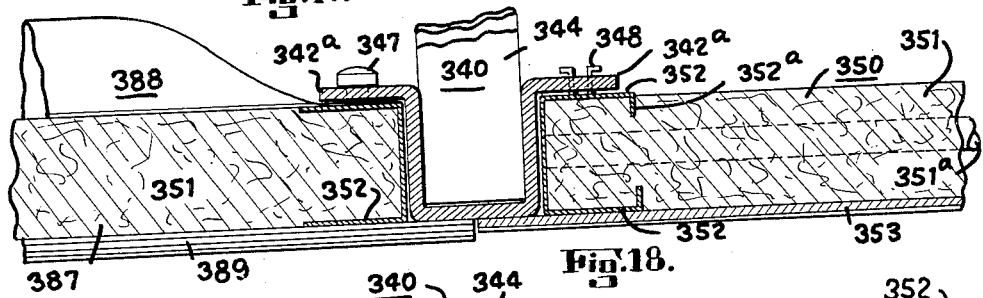
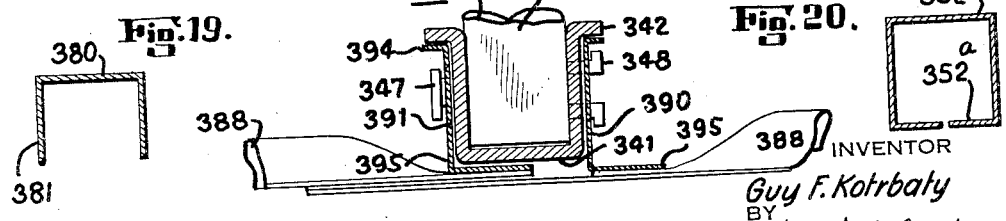
INVENTOR
Guy F. Kotrbaty
BY
Frederick A. Norton
ATTORNEY Patented Aug. 15, 1939

2,169,255

UNITED STATES PATENT OFFICE 2,169,255

BUILDING UNIT AND ELEMENT

Guy F. Kotrbaty, Chestnut Hill, Pa., assignor to Fer-O-Con Corporation, New York, N. Y., a corporation of Delaware Original application April 22, 1935, Serial No. 17,591. Divided and this application December 7, 1937, Serial No. 178,619

11 Claims. (Cl. 72—1)

This invention relates to improvements in building construction systems and units and elements therefore. This application is a division of my application, Ser. No. 17,591, filed April 22, 1935, now matured into Patent No. 2,101,074, of December 7, 1937.

The improvements of the present invention relate more in detail to generally prefabricated unitary and composite wall members and wall units and to improvements in methods and means for assembling the same into completed structures.

The present invention includes as additional features of novelty improved wall joint locking and/or decorative members and associated wall panel features. In addition, the novel improvements of the present invention include provisions for the utilization of skeletal or partly-skeletal structural features in prefabricated elements and structures including preformed materials and panels thereof, and the erection and assembly of the same into completed units and structures with or without associating suitable hardenable structural plastic materials therewith.

It is a feature of the present invention to provide a building construction system formed of self-supporting units mutually abutted and interlocked by novel structural locking members.

It is another feature of this invention to provide improved structural elements, including stud members adapted to receive structural locking and keying members and form composite supporting members therewith.

A further feature of novelty of the present invention is the provision of improved floor supporting means associated with structural wall supports.

Another feature of novelty of the present invention resides in the preparation of multi-partite structural wall members and units.

It is also a feature of novelty of the present invention to provide preformed, self-supporting wall sections having substantially completely finished surfacings and adapted to be mutually associated in completed walls by a variety of integral and composite locking and/or keying means.

Other features of novelty include preformed, self-supporting wall members provided with a variety of internal heat and moisture insulating means, and including hardened reinforced structural plastic segments as separate elements adapted to be assembled into a structural entity either at the place of manufacture or erection or wholly or in part at both places.

Special features of novelty also include novel keying and locking means with wall structural features with or without integral or separate furbishing and ornamental and protective elements for wall panel or element joints.

Particular features of novelty include the preparation and utilization of preformed, self-supporting wall panel sections of room height or building height mutually associated in complete wall structures with vertical supporting and locking members incorporated therein or adapted to be structurally associated therewith.

An exceptional feature of novelty of the present invention is the provision of a mechanically interlocked skeletal building structure provided either with preformed structural wall, floor, ceiling and roof members adapted to be assembled into a complete structure or provided with means for receiving structural plastics to form composite, reinforced structures.

It is also a feature of novelty of the present invention to provide improved studding and beam elements adapted to be mutually interlocked or keyed together, and so constituted and arranged as to permit the free passage therethrough of service pipes and conduits of various kinds.

Other features of novelty of the present invention include self-supporting building construction units adapted to be associated with other like units and separate members to form composite building supporting members provided with panel-receiving means for securing panelling or surfacings to the walls thereof.

Another feature of novelty pertaining to this building construction includes walls of self-supporting building units of more than one story in height and provided with mechanical tie-in means for flooring placed above basement levels.

It is a feature of the present invention to provide an improved building construction of steel and structural plastic materials in which wall and floor joints are mechanically formed.

It is also a feature of the present invention to provide such mechanical wall and floor joints without obstructing continuous wall members of spaced panelling supported on and between composite studding.

Another feature of novelty of the present invention resides in the use of structural self-supporting building members of more than one story in height and adapted to be mutually interlocked with like members to form building walls and to have flooring members mechanically secured thereto.

It is also a feature of novelty and advantage of the present invention to provide a steel building with the several parts mechanically interlocked and adapted to receive plastic surfacings.

These and other desirable features will be described in the accompanying specification and illustrated in the drawings, certain preferred forms being shown by way of illustration only, for, since the underlying features may be incorporated in other specific structural assemblies, it is not intended to be limited to the ones here shown except as such limitations are clearly imposed by the appended claims.

In the drawings like numerals refer to similar parts throughout the several views, of which Fig. 1 is an elevation of an improved building wall structural unit having staggered plastic-receiving panels adapted to form overlap joints with abutted like units;

Fig. 2 is an elevation, partly in broken section, of structural wall units showing means for securing a variety of surfacings to the panel;

Fig. 3 is a view of a composite stud construction in which the members are adapted for vertical sliding engagement;

Figs. 4 and 5 are end elevations of mating or coacting sections of the stud assembly shown in Fig. 3;

Fig. 6 is an elevation of a stud including floor connection members and integral shoe flanges together with panel key receiving means;

Figs. 7 and 8 are elevations of end sections of modified stud members;

Fig. 9 is an elevation of a self-supporting, wall panel section having stud engaging edge reinforcing members and an overlapping surfacing on one side thereof;

Fig. 10 is a vertical section, partly in elevation of a building wall, showing foundation connections and floor and roof connections;

Fig. 11 is a starting and aligning channel adapted to receive and lock the shoe section of the studs of Figs. 7, 8 and 10;

Fig. 12 is a locking key or pin adapted for use with the channel of Fig. 11 and the studs of Figs. 6-8;

Fig. 13 is a horizontal section of a wall joint showing multi-partite panel construction and keying means thereof to form a composite panel, and showing hair-line surface joints;

Fig. 14 is a view similar to Fig. 13 and showing a modified multi-partite panel together with a combination batten and key;

Fig. 15 is a horizontal section of a wall joint and panel keying means for multi-partite reinforced panels of hardened structural plastic;

Fig. 16 is a horizontal section through a wall stud structure showing a variety of panelling members secured thereto;

Figs. 17 and 18 are views similar to Fig. 16 showing a uni-lateral installation of modified panelling, and Figs. 19 and 20 are horizontal sections of spacing members for improved stud and stanchion constructions.

The building unit shown in Fig. 1, and identified generally by the numeral 290, comprises a pair of opposed panel sections 291 secured to and spaced apart by end supporting stud and securing members 292. These members may have any desired shape or form, and will not be specifically claimed except in the general combination. The panel sections 291 are so assembled with respect to the supporting stud members or end sections 292 as to provide one edge 293 thereof flush with an abutting edge or stud section 292, while the other edge of the panel member may be provided with an overhanging or overlapping portion 294, overlapping the opposed stud section 292. The stud sections may be provided with key hole locking means or the like 296, on one or both sides thereof to receive cooperating locking means of abutted structural members. With this type of construction any suitable type of panelling 291 may be used, including metal structural members of foraminous metal, including expanded metal lath or the like, and a suitable structural finish may be applied thereover to form a preformed unit, or the members 290 may be assembled as skeleton structures in a building construction and cementitious plastics applied over the assembly. It will be noted that by providing alternating overlapping portions 294, the joints formed between sections 292 of abutting members will be broken so that there will be no through and through joints between inner and outer walls of the units and wall surface of which they form a part. This construction is particularly serviceable where the masking of wall panel joints is a desired feature. If tiling, brick facings and other simulated structural finished members are to be applied to one or both surfaces of the panellings, the transverse supporting ribs 297 of the panel surfacings may be substituted for or be formed as track members to permit the utilization of such finishes.

The selfsupporting wall unit shown in Fig. 2, and designated generally by the numeral 310, is formed in the same manner as member 304, the end stud sections conforming generally to the structure designated by the numeral 262. The panels 311 may have metal lath or other foraminous surfacings over the studs and secured thereto and an insulating filling 312 may be used to fill the inter-panelling space. In this construction brick finishes, indicated generally by the numeral 313, may be secured to and by track members 306 in the same manner as members 307 are secured to similar members in the wall unit 304. In the present construction of wall units 310, the track members may be spaced closer together. This wall may have the usual flashings 249 appropriately disposed and suitable wall surfacings 305.

Referring now to Figs. 3, 4 and 5, the composite stud assembly 270 includes a pair of abutted and interlocked stud sections designated generally by numerals 271 and 272. The members comprise opposed channel members 273 with the channel sections facing each other. The male section 272 is provided with transverse lattice or cross pieces 274 secured to the stud or stanchion sections 273 in any suitable manner, as by welds, bolts, rivets, or the like, all as indicated generally by the numeral 275. The cooperating lattice stud section of the composite stud member 271 may include the usual end stud or stanchion section 273 with transverse lattice members 276 having locking and gripping tongues 277 associated therewith, either integrally or secured thereto in any desired manner. The tongues or gripping sections 277 are disposed on the side of stud section 271 nearest that of the opposed section, and are adapted to fit over and engage the lattice sections 274 of member or section 272 in vertical sliding and locking engagement. This construction is particularly adapted for use in the vertical sliding and locking of abutted building sections into opposed aligned relationship. It will be noted that the sections or tongues 277 are of a width sufficient to pass between the stud sections 273 of member 272 and be secured and held thereby and prevent weaving or displacement of the stud sections.

In Figs. 6 to 12, inclusive, are shown wall panel structures and supports. In Fig. 6 a hollow stud member 30 is generally rectangular in cross section, and has a longitudinal slit at one edge with the opposed side 32 being continuous. The flat sides 33 have apertures 34, usually in pairs. Feet 35 are inturned toward each other and engage into slots 41 of supporting channel members 40 and held secured therein by locking keys 43 in engagement therewith through transverse slots 42. Floor members 400 may be hung on the connection plates 408 at floor levels and provided with any suitable surfaces. Wall panels 51 may have surfacings 52 and edge binding members 53. The inner panels 51 have edge members applied thereover, and fitted with hooks 34a adapted to engage in apertures 34 of the stud sections 30. With pairs of apertures 34, a pair of building panels 51 may be hung on the stud members, back to back, to give a multi-partite insulated wall panel construction. In Fig. 7, the modified stud construction may have a key or supporting bead 39 formed at one side thereof. In Fig. 8 the stud member is shown as a hollow tubing with apertures 34 on all sides thereof.

The hollow studs 30 are shown in combination in Figs. 13, 14, and 15. In Fig. 13 the wall panel member 50 each has an inside panel 185 and abutted panel 186, binding members 189 over the panels, and secured to the hook members 34a. In Fig. 14, single panels 50 are used, and sliding key 38 is slid over the flanges 38a of the stud section 30. In Fig. 15, reinforced concrete panels 60 may have end supporting and bracing members 63 formed with angular shelving portions 64, stiffening angles 65, 66, and edge portion 67 with anchor 68. Supporting hooks 34a are secured to section 64 and the panels hung in place on the stud members 30. The modified panel members 70 are likewise reinforced with centrally disposed wire mesh or metal lath 72. Special binding and edge portion 73 are integrally secured in place and these likewise may have hooks 34a by means of which they are hung in place on the stud members 30. In Figs. 16, 17, 18, 19 and 20, panel members of various materials are shown. In Fig. 16 panel 350 may be made of insulating material and surfaced with asbestos. Panel 358 may be of cement or concrete and apertured as indicated at 357 to lighten the weight. Panel 365 is a three piece member joined as a unit. Panel 380 is similar to 365, the latter being reinforced by rod 369, while member 380 has reinforcing ribs 383. Various surfacings may be applied to each of these members, and each is adapted to be supported on stud section 341, which are secured across supporting bracing members 344 of the latticed stud member 340.

It will be now appreciated that there have been provided improved structural building systems including preformed and prefabricated wall and floor units and panels either as unitary constructions or as composite multi-partite constructions, said panels and building units being adapted to be secured to improved building supporting members and to engage same in mutual interlocking relationship. In addition, the improvements of the present invention have been disclosed with structural skeleton supporting members and units adapted to be used as carcasses for a variety of preformed building units and sections, as well as to permit the fabrication and erection of aligned wall and corner wall constructions and to permit the elaboration of the structural carcass sections into complete building skeletons over which structural cementitious coating and panelling, either cast or applied in preformed and prefabricated condition in situ, or structural elements and composite parts may be secured.

While certain novel features of the invention have been shown and described and are pointed out in the annexed claims, it will be understood that various omissions, substitutions and changes in the forms and details of the forms and assemblies illustrated and in their mutual cooperation may be made by those skilled in the art without departing from the spirit of the invention.

What is claimed is:

1. A wall construction, including, in combination, hollow vertical supporting members of generally rectangular cross-section, keying apertures in the longitudinal edges of the same, and wall panels secured on either side of the said post member, the said wall sections comprising composite wall panel members abutted back-to-back, each of said composite wall sections comprising a two-part body portion of laminated construction, the edges of the inner lamina being provided with metallic surfacing and protected by having an outwardly extending flange portion, the said first lamina and extending flange section supporting and securing a second lamina with cementitious securing means disposed between the two said laminae; locking tongued members associated with the exterior surfaces of the said end-supporting and protecting members and adapted to be engaged by and held in the said post members; and exterior finish surfacings disposed over said members and extending beyond the edges thereof a sufficient distance to permit the abutment of the said edges with other like members over the exterior faces of the supporting posts whereby to provide substantially hair-line joints between adjacent and aligned wall sections.

2. In a wall construction, preformed wall panelings, including two-part, back-to-back panel sections, each said section being provided with edge-binding members and means for securing the bindings to the members; locking means secured to the edges of the said binding members; and finish surfacings applied to one side of the panel sections and overlapping the edges thereof.

3. In a wall panel construction of the type claimed in claim 2, the improvements comprising a cementitious bonding applied to the unfinished surfaces of the panel sections before erection, whereby panel sections are adapted to form a unitary composite wall member when abutted together in place.

4. A composite wall construction, including, in combination, a hollow wall-supporting post member, keying apertures in said post, two-part wall sections secured to said post, the said wall sections comprising cementitious aggregates disposed on and secured to structural panel-supporting members; edge-binding members incorporated with said panel sections; the said members being generally conformed to the corners of the post member and provided with locking tongues adapted to engage in locking engagement with apertures in the said post.

5. A structural element, comprising a metal lath backing portion, an edge section comprising a metallic sheet member secured to the lath at the edges thereof, the said edge member including a stiffening flange extended outwardly to form an abutting and guide portion and being provided with a shoulder portion continued longitudinally of the panel section and terminating in a rectilinearly disposed flange having an inturned edge section; a cementitious aggregate disposed on the said metal lath backing, the said edge sections being formed flush with the last-named edge section; and keying tongues secured to the interiorly extending flange section of the edge members.

6. A wall panel section construction, including a cementitious plastic mass formed in a panel construction; reinforcing, transverse members disposed interiorly of the mass; protecting, guiding and structural metallic members over the ends of the panels, including an end edge section having an internal keying flange; an angularly disposed section inwardly of the panel member, the said angularly disposed section being continued interiorly of the removable member to form an abutting shoulder; a reversed column section extending from said shoulder; a cementitious plastic aggregate filled in and keyed to the said shouldered sections; and tongued keying means formed on the lateral exterior surfaces of the said reinforcing metallic shoulder.

7. A wall construction unit comprising latticed stud end sections; surface supporting transverse members disposed between the stud members and secured thereto; insulating fillings in the members; tile members on the surfaces of the members, supported in and between the several transverse supporting members, the said tilings being provided with grout materials to water-proof same; and flashings secured to the said unit at floor levels.

8. A wall unit of the type claimed in claim 7, including transverse surfacing members adapted to secure bricks and the like as facings on the said members, and a filling applied in and between the said brick-facing members.

9. A unit wall panel construction, including a vertical channel stud member; keying flanges having keying apertures extending laterally from the sides of the channel, panel members abutted against said stud member and locked thereto, the said panel members having edge-securing and -protecting channels and keys secured to the inner edges of said channels; certain of said panel members including internally disposed strengthening members, and certain others of said panel members having reinforcing lathing disposed on the interior of the members, and all of said panel members being provided with surfacings overlapping the body portion of the said panels and extending to the center of the said stud members and adapted to form hair-line joints with abutted like members of adjacent units.

10. In a wall panel construction unit of the class described, a composite panel unit consisting of a steel reinforced panel with metal channel-like protecting and stiffening members in gripping relation along its vertical edges, the said channel members being provided with fastening and locking means along one flange of the channel-like member, the said reinforced composite panel being covered with a surface finish panel, the edges of said surface finish panel extending beyond the edges of the reinforced backing panel so as to cover half of the structural supporting member of the composite panel unit and provide a hair-line joint between itself and other abutted companion units and engaged in mutual locking relation with the supporting structure.

11. A prefabricated wall panel section for composite wall units, including a base portion and an overlapping surfacing, edge-stiffening and -protecting channels on the edges of the base portion, and locking tongues formed on said edge portions and adapted to fit in and engage locking apertures in vertical structural members and formed on one side thereof, the said locking apertures being adapted to receive other like members whereby to form composite wall sections having surfacings extending over exposed portions of stanchion members and adapted to abut other like units and form hair-line joints; the said panel section being adapted to be routed or chased on the inner abutting faces to receive and secure building services.

GUY F. KOTRBATY.